(No Model.)

J. R. OWEN.
CORN PLANTER.

No. 269,699. Patented Dec. 26, 1882.

WITNESSES:
C. Neveux
C. Sedgwick

INVENTOR:
J. R. Owen
BY Munn & Co
ATTORNEYS.

UNITED STATES PATENT OFFICE.

JOHN R. OWEN, OF PULASKI, TENNESSEE.

CORN-PLANTER.

SPECIFICATION forming part of Letters Patent No. 269,699, dated December 26, 1882.

Application filed May 17, 1882. (No model.)

*To all whom it may concern:*

Be it known that I, JOHN RICKMAN OWEN, of Pulaski, in the county of Giles and State of Tennessee, have invented a new and useful Improvement in Corn-Planters, of which the following is a full, clear, and exact description.

Reference is to be had to the accompanying drawings, forming a part of this specification, in which similar letters of reference indicate corresponding parts in both the figures.

Figure 1:
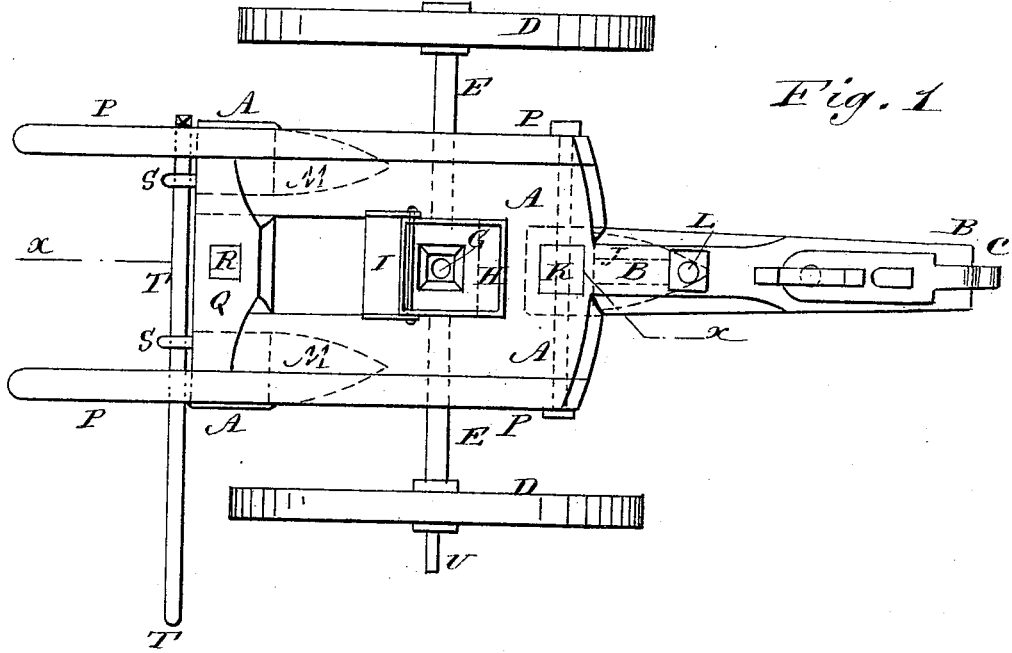
Figure 2:
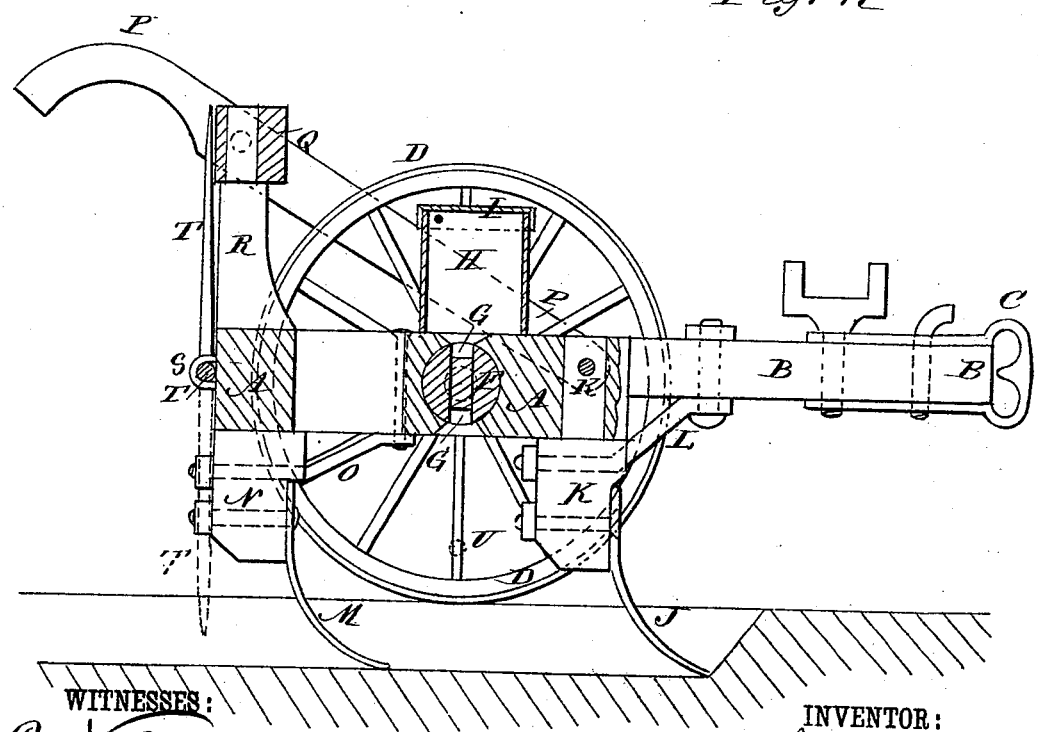

Figure 1 is a plan view of my improvement. Fig. 2 is a sectional side elevation of the same, taken through the line x x, Fig. 1.

The object of this invention is to facilitate the planting of corn, and also to promote convenience in guiding the machine parallel with the row last planted.

The invention consists in the peculiar construction and arrangement of the parts of a corn-planter, as hereinafter more fully set forth, and pointed out in the claim.

A represents the frame of the machine, to the center of the forward end of which is attached a draw bar or beam, B, having a clevis, C, at its forward end to receive the draft.

D are the wheels, the axle E of which revolves in bearings formed in or attached to the middle part of the frame A.

To the center of the axle E is attached a short cylinder, F, in the opposite sides of which are formed recesses or cups G, of such a size that each will contain enough seed for a hill, so that the hills will be planted at a distance apart equal to half the circumference of the wheels D. When the seed is to be planted in drills a number of smaller recesses will be formed in the cylinder F, so that the machine will drop the seed in small quantities and close together.

To the frame A, directly over the cylinder F, is secured the seed-box H, which is provided with a hinged cover, I.

A furrow is opened to receive the seed by a plow, J, which is attached to the lower end of a standard, K, the upper end of which is attached to the center of the forward end of the frame A. The standard K is strengthened against the draft strain by a brace, L, attached at its rear end to the said standard and at its forward end to the draw-bar B. The seed is covered by the plows M, attached to the lower ends of the standards N, the upper ends of which are attached to the rear corners of the frame A, and which are strengthened against the draft strain by the braces O, attached to them and to the said frame A.

To the sides of the forward part of the frame A are attached the forward ends of the handles P, by which the machine is guided. The rear parts of the handles P are connected by a bar, Q, to the center of which is attached the upper end of the standard R, that supports the said handles at the proper height.

To the rear end of the frame A are attached staples S, or other bearings, in which works the middle part of the rod T, the end parts of which are bent at right angles in opposite directions. The end parts of the rod T are made of such a length that when either of said parts is turned downward its end will reach to or nearly to the ground. The middle part of the rod T is made of such a length that when the said rod is slid toward the planted part of the field and its end is turned downward the said end will be directly over the row of hills last planted, so that the rod T will serve as a gage to plant the hills parallel with the rows of hills previously planted.

To the side of one or both the wheels D is attached a pin, U, in such a position as to be in the same plane with the seed-dropping cups G, to serve as an indicator to show the driver when the said cups are in position to drop the seed.

Having thus described my invention, I claim as new and desire to secure by Letters Patent—

In a corn-planter, the combination, with the frame A, of the bearings S and the rod T, adapted to be slid in said bearings, and having its end parts bent at right angles in opposite directions, substantially as herein shown and described, whereby the said rod will serve as a gage in guiding the machine parallel with the row of hills last planted, as set forth.

JOHN RICKMAN + OWEN.
his mark.

Witnesses:
N. SMITHSON,
WM. MALONE.